United States Patent [19]

Dietz et al.

[11] Patent Number: 5,837,160
[45] Date of Patent: Nov. 17, 1998

[54] CHIRAL CLCPS CONTAINING COLORED MONOMERS

[75] Inventors: Erwin Dietz, Königstein; Axel Schönfeld, Wiesbaden, both of Germany

[73] Assignee: Hoechst Aktiengesellschaft, Frankfurt, Germany

[21] Appl. No.: 859,750

[22] Filed: May 21, 1997

[30] Foreign Application Priority Data

May 23, 1996 [DE] Germany .......................... 196 20 746.0

[51] Int. Cl.[6] .......................... C09K 19/52; C09K 19/32; C09K 19/34; F21V 9/00
[52] U.S. Cl. ................. 252/299.01; 252/299.62; 252/299.1; 252/299.61; 252/582
[58] Field of Search .......................... 252/299.01, 299.62, 252/299.1, 299.61, 582

[56] References Cited

U.S. PATENT DOCUMENTS

| | | | |
|---|---|---|---|
| 4,631,328 | 12/1986 | Ringsdorf et al. | 526/259 |
| 4,943,617 | 7/1990 | Etzbach et al. | 525/329 |
| 5,093,025 | 3/1992 | Koide et al. | 252/299.01 |
| 5,098,878 | 3/1992 | Riepl et al. | 528/15 |
| 5,389,285 | 2/1995 | Shannon et al. | 252/299.1 |
| 5,514,296 | 5/1996 | Chen et al. | 252/299.01 |

FOREIGN PATENT DOCUMENTS

| | | |
|---|---|---|
| 090 282 | 3/1983 | European Pat. Off. . |
| 260 687 | 9/1987 | European Pat. Off. . |
| 333 022 | 3/1989 | European Pat. Off. . |
| 391 368 | 4/1990 | European Pat. Off. . |
| 44 18 075 | 11/1995 | Germany . |

*Primary Examiner*—C. H. Kelly
*Attorney, Agent, or Firm*—Susan S. Jackson

[57] ABSTRACT

The invention relates to cholesteric liquid-crystalline polymers containing at least one colored comonomer which absorbs light in the visible wavelength region. The colored comonomers can be bifunctional hydroxyl, amino and/or carboxyl derivatives of anthranthrone, anthraquinone, dioxazine, phthalocyanine, quinacridone, diketopyrrolopyrrole, perylene, perinone, azomethine or azo pigments or aminostilbenecarboxylic acids. Coatings containing such polymers are distinguished by coloristic effects which depend on the viewing angle and cannot be achieved by absorption pigments alone or by CLCP effect coatings.

11 Claims, No Drawings

CHIRAL CLCPS CONTAINING COLORED MONOMERS

The invention relates to cholesteric liquid-crystal polymers (CLCPs) containing colored monomer units, to a process for their preparation and to their use.

Cholesteric main-chain polymers are known and can be prepared analogously to nematic main-chain polymers by using an additional chiral comonomer (U.S. Pat. No. 4,412,059; U.S. Pat. No. 4,652,626; U.S. Pat. No. 5,358,661; EP-A-0 391 368) or by reacting nematic main-chain polymers (LCPs) with additional chiral comonomers (EP-A-0 283 273). Cholesteric main-chain polymers are distinguished by their helical superstructure. This results firstly in the material no longer having the anisotropy of the mechanical properties which is usual in nematic liquid-crystal polymers. Depending on the content of chiral monomer, the material exhibits pronounced color effects based on selective reflection at the helical superstructure. The precise reflection color depends on the viewing angle and in particular on the pitch of the helix. For any desired viewing angle—for example a perpendicular plan view of a specimen—the reflection color that appears is a color having a wavelength which corresponds to the pitch of the helical superstructure. This means that the reflected light has a shorter wavelength the smaller the pitch of the helix. The resultant helix pitch depends essentially on the proportion of the chiral comonomer, the nature of the incorporation into the polymer, the degree of polymerization and the structure of the chiral comonomer.

In addition, many systems also exhibit a temperature dependence of the pitch in the cholesteric phase.

The color of the cholesteric liquid crystals is due to selective reflection. It is thus fundamentally different to the coloring of classical pigments, whose color is due to light absorption (absorption pigments).

In order to achieve pronounced color effects in thin layers of cholesteric liquid crystals, an absorbent, in particular black background is generally necessary, since otherwise an inadequate hiding power of the cholesteric liquid crystals means that the part of the light that is not selected is reflected at the background, which weakens the color impression. It is furthermore known (H. J. Eberle, Liquid Crystals, 1989, Vol. 5, No. 3, pages 907–916), that a black background can be replaced by backgrounds of a different color and that it is also possible to mix the pigments comprising liquid-crystal networks with classical absorption pigments, giving new, angle-dependent color impressions. Thus, the abovementioned publication describes by way of example a mixture of a yellow cholesteric liquid crystal with a green absorption pigment, which produces a red shift with increasing viewing angle. By contrast, if the same liquid crystal is used on a black background, a blue shift is observed.

A disadvantage in these coloring methods is the mixing of two materials which give different colors, namely the classical absorption pigment with the cholesteric liquid-crystal pigment, which requires an additional dispersion step. The colored painting of the background is also associated with disadvantages. Firstly, this is an additional process step which causes additional costs, and secondly the color effect is now dependent on the thickness of the liquid-crystal layer applied on top, since this determines the ratio between absorption pigment and liquid-crystal pigment. In addition, paints produced in this way do not have the requisite ease of refinishing.

The object of the present invention is to circumvent the disadvantages described in the prior art and to provide a material which has viewing angle-dependent colors, but can be employed directly as a one-component pigment and has high temperature stability and high chemical resistance (insolubility).

It has been found that the disadvantages described in the prior art can be circumvented, surprisingly, by means of cholesteric liquid-crystalline polymers which contain at least one further colored comonomer, and that novel materials can be provided in a simple manner.

The present invention relates to a cholesteric liquid-crystalline polymer (CLCP) which contains at least one colored comonomer which absorbs light in the visible wavelength region.

If the synthesis of the cholesteric liquid-crystalline polymers is carried out using an additional comonomer which absorbs light in the visible region (at least one absorption maximum between 350 and 750 nm), polymers are obtained which, in the unoriented state, have the color of the additional comonomer. If such a sample is oriented in the cholesteric phase, the bright color properties of selective reflection can be observed. Surprisingly, these differ from those of cholesteric polymers in that the hues are modulated by the absorption. This means that a polymer containing, for example, a red comonomer has, instead of, for example, a golden yellow color, has a golden red color in the cholesteric phase. The angle dependence of the cholesteric reflection colors also appears in a new way through modulation with the absorption color. Thus, a cholesteric liquid-crystalline polymer having said golden red color has a reddish green color when viewed at an oblique angle.

The cholesteric polymers on which the invention is based cover both cholesteric liquid-crystalline main-chain polymers, cholesteric liquid-crystalline side-group polymers and combined liquid-crystalline main-chain/side-group polymers.

Cholesteric liquid-crystalline side-group polymers are, for example, polysiloxanes, cyclic siloxanes, polyacrylates or polymethacrylates containing mesogens in the side groups. The mesogens in the side group are, for example, cholesterol-substituted phenylbenzoates or bisphenols.

The main-chain polymers are preferably liquid-crystalline polyesters, polyamides or polyesteramides containing aromatic and/or cycloaliphatic hydroxycarboxylic acids, aromatic aminocarboxylic acids, aromatic and/or cycloaliphatic dicarboxylic acids, and aromatic and/or cycloaliphatic diols and/or diamines, and one or more chiral, bifunctional comonomers.

Cholesteric liquid-crystalline main-chain polymers are generally prepared from a chiral component and from hydroxycarboxylic acids and/or a combination of dicarboxylic acids and diols. In general, the polymers essentially consist of aromatic constituents. However, it is also possible to employ aliphatic and cycloaliphatic components, for example cyclohexane dicarboxylic acid.

When selecting the colored monomer units, it should be ensured that they have the thermal stability needed for synthesis. In the case of heat-sensitive, colored monomer units, it is advantageous to select a synthetic route which avoids high temperatures. Thus, for example, in the preparation of a polyester using heat-sensitive, colored monomer units, the melt condensation can be replaced by gentler condensation in nonaqueous suspension or condensation of acid chlorides with hydroxyl or amino compounds in solvents.

For the purposes of the present invention, suitable colored comonomers are hydroxyl, amino and/or carboxyl derivatives of anthanthrone, anthraquinone, dioxazine, phthalocyanine, quinacridone, diketopyrrolopyrrole, perylene, perinone, azomethine or azo pigments, aminostilbenecarboxylic acids or a combination thereof.

For the purposes of the present invention, preference is given to cholesteric liquid-crystalline main-chain polymers comprising a) from 0 to 99.8 mol % of one or more compounds from the group consisting of aromatic hydroxycarboxylic acids, cycloaliphatic hydroxycarboxylic acids and aromatic aminocarboxylic acids;

b) from 0 to 50 mol % of one or more compounds from the group consisting of aromatic dicarboxylic acids and cycloaliphatic dicarboxylic acids;

c) from 0 to 50 mol % of one or more compounds from the group consisting of aromatic and cycloaliphatic diols and diamines;

d) from 0.1 to 40 mol %, preferably from 1 to 25 mol %, of chiral, bifunctional comonomers; and e) from 0.1 to 50 mol %, preferably from 1 to 25 mol %, of bifunctional, colored components which have an absorption in the wavelength region of visible light (chromophores), where the sum is 100 mol %.

Regarding the above percentages, it must be ensured that the functional group stoichiometry in the polycondensation which is known to the person skilled in the art is guaranteed. In addition, the polymers may also contain components containing only one functional group or containing more than two functional groups, for example dihydroxybenzoic acid, trihydroxybenzenes or trimellitic acid. This allows the molecular weight of the polymers to be modified. The components containing more than two functional groups act as branching points in the polymer and may only be added in low concentrations, for example from 0 to 5 mol %, if crosslinking of the material during the condensation is to be avoided.

Particular preference is given to cholesteric main-group polymers which are built up from the following units in the individual monomer groups:

a) Aromatic hydroxycarboxylic acids and aminocarboxylic acids: Hydroxybenzoic acids, hydroxynaphthalenecarboxylic acids, hydroxybiphenylcarboxylic acids, aminobenzoic acids and hydroxycinnamic acids.

b) Aromatic dicarboxylic acids and aliphatic dicarboxylic acids: Terephthalic acid, isophthalic acid, biphenyldicarboxylic acids, naphthalenedicarboxylic acids, cyclohexanedicarboxylic acids, pyridinedicarboxylic acids, bis(carboxyphenyl) ethers, carboxycinnamic acids and

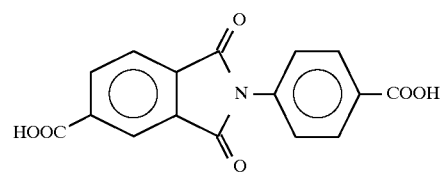

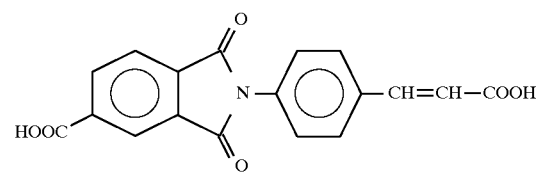

c) Aromatic diols, aminophenols and diamines: Hydroquinones, dihydroxybiphenyls, tetramethyldihydroxybiphenyls, naphthalenediols, dihydroxydiphenyl sulfones, dihydroxydiphenyl ethers, dihydroxyterphenyls, dihydroxydiphenyl ketones, phenylenediamines, diaminoanthraquinones, dihydroxyanthraquinones and

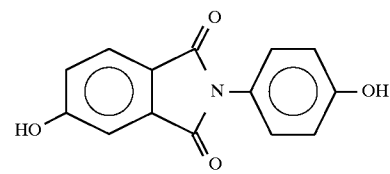

d) Chiral, bifunctional monomers: Isosorbide, isomannide, isoidide, camphoric acid, (D)- or (L)-methylpiperazine, (D)- or (L)-3-methyladipic acid, butane-2,3-diol,

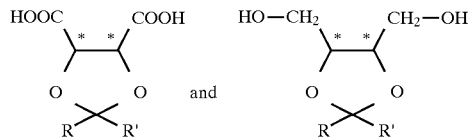

where R and R' are each, independently of one another, H, $C_1$–$C_6$-alkyl or phenyl, preferably H or $CH_3$.

e) Colored, bifunctional comonomers, for example

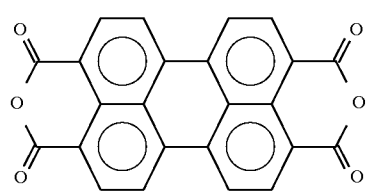

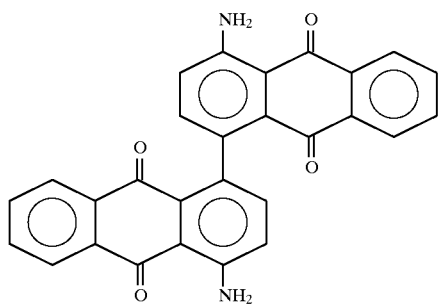

-continued
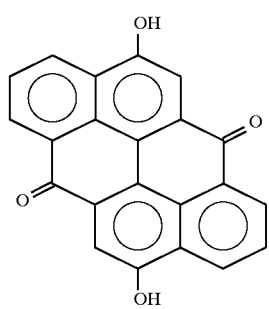 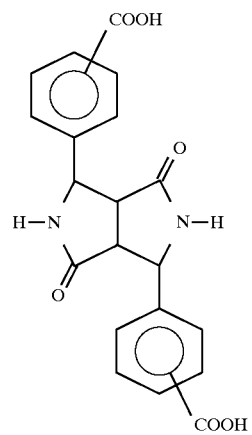 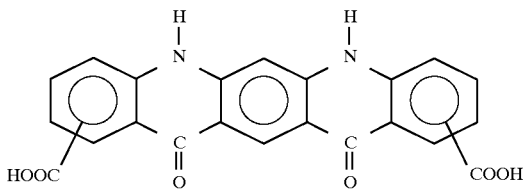
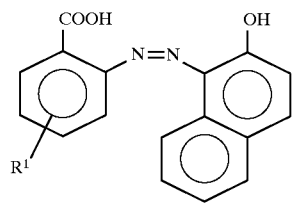 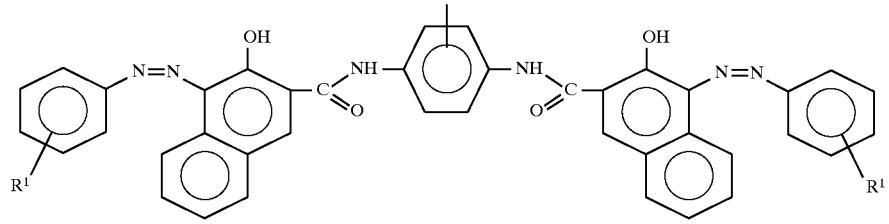
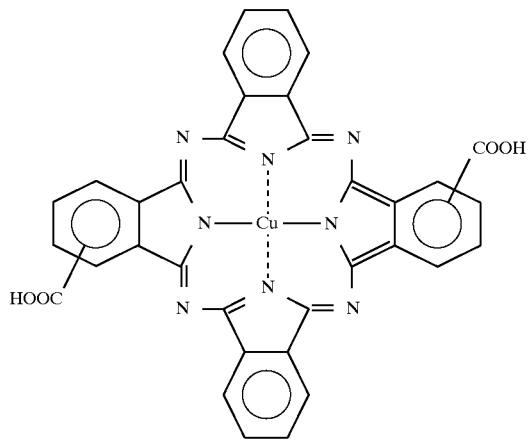 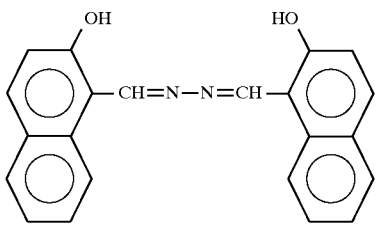
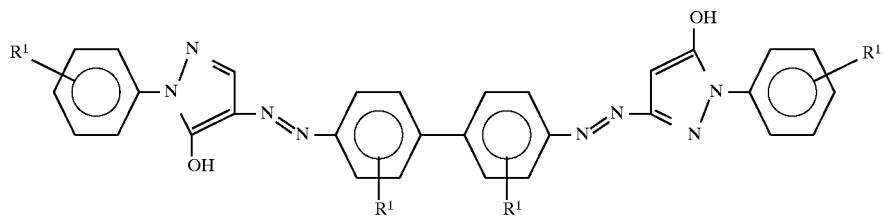
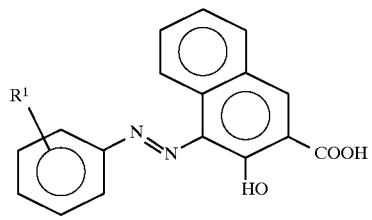 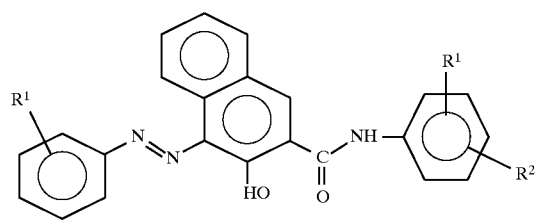

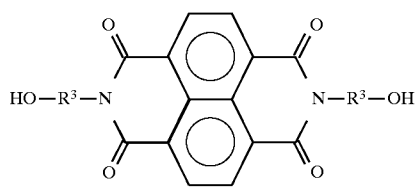 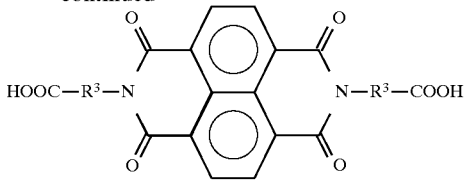

where $R^3$ is $C_6$–$C_{18}$-arylene, preferably phenylene;
$R^1$ is H, halogen, preferably F, Cl, or Br, methoxy, CN, $NO_2$, $C_6$–$C_{12}$-aryl or $C_1$–$C_4$-alkyl and
$R^2$ is a sulfonic acid group or a derivative thereof, preferably sulfonamide or a sulfonic acid salt.

If sulfonic acid groups are used as functional groups in the condensation, it may be advantageous to employ them in an activated form, for example as sulfochloride or as a sulfonate.

The substances mentioned may also be replaced by other structural isomers or derivatives thereof. Thus, it is also possible, for example, to replace

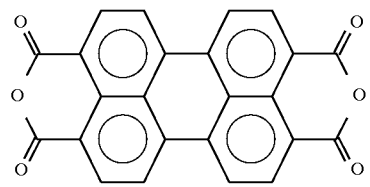

by a derivative of the formula

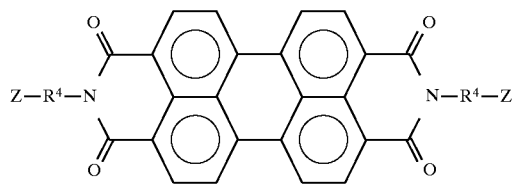

where $R^4$ is branched or unbranched $C_1$–$C_{20}$-alkylene, $C_6$–$C_{10}$-arylene or $C_7$–$C_{20}$-aralkylene, and Z is —COOH, —OH or —$NH_2$.

The polymer units described may also contain further substituents, for example methyl, methoxy, cyano or halogen.

For the purposes of the present invention, very particular preference is given to polymers containing one more monomers from the group consisting of p-hydroxybenzoic acid, 2-hydroxy-6-naphthoic acid, terephthalic acid, isophthalic acid, 2,6-naphthalenedicarboxylic acid, hydroquinone, resorcinol and 4,4'-dihydroxybiphenyl; camphoric acid, isosorbide, isomannide as the chiral component; and, as colored component, one or more of the compounds N,N'-bis-(3-aminophenyl)- 3,4,9,10-perylenetetracarboxylic acid diimide, N,N'-bis-(4-hydroxyphenyl)-3,4,9,10-perylenetetracarboxylic acid diimide, N,N'-bis-(4-carboxyphenyl)-3,4,9,10-perylenetetracarboxylic acid diimide and in particular perylene-3,4,9,10-tetracarboxylic 3,4, 9,10-dianhydride.

The invention also relates to a process for the preparation of cholesteric liquid-crystalline polymers, which comprises condensing the monomeric compounds on which said polymers are based, as such or in the form of a reactive derivative, in the melt, in solution or in the emulsified or disperse phase.

The monomers employed in accordance with the invention can either be used directly or in the form of expedient precursors, which are converted into the desired monomers under the subsequent reaction conditions. For example, aminophenol and trimellitic anhydride can be employed instead of N-(4-hydroxyphenyl)trimellitimide.

The polycondensation can be carried out by any conventional method, for example by melt condensation with acetic anhydride, which is described, for example, in EP-A-0 391 368. The condensation with acetic anhydride is also possible in solution or in the disperse or emulsified phase.

The linking of the monomers preferably takes place via ester bonds (polyesters), amide bonds (polyesteramides/polyamides) and/or via imide bonds (polyesterimides/polyimides), but the linking can also take place via other known types of linking.

When selecting the monomer units, it must be ensured that the functional group stoichiometry known to the person skilled in the art is guaranteed, i.e. functional groups which react with one another in the polycondensation reaction are employed in corresponding molar ratios. For example, when dicarboxylic acids and diols are used, a number of hydroxyl groups which corresponds to the number of carboxyl groups must be present. However, it is also possible to use specific excesses of functional groups, for example more carboxyl groups than hydroxyl groups, in order, for example, to modify the achievable molecular weight.

The carboxylic acids can also be replaced by carboxylic acid derivatives, for example acid chlorides or carboxylates. The hydroxyl components can also be replaced by corresponding hydroxyl derivatives, for example acetylated hydroxyl compounds.

The components can either be employed directly as low-molecular-weight monomers, or low-molecular-weight or polymeric components can be reacted with a polymer which already contains some of the components. For example, a CLCP containing no colored components can be mixed and brought to reaction with corresponding colored components in the melt, in solution or in a disperse or emulsified phase, so that the colored component is incorporated into the polymer, for example by transesterification.

For the synthesis of novel polymers, the colored comonomers can either by employed directly or in the form of precursors which are converted into the components which absorb in the visible wavelength region during the condensation. Thus, it is possible to use, for example, naphthalenetetracarboxylic dianhydride, which is not colored itself, and aminophenol, which then form a colored component during the reaction via an imide bond.

The novel polymers can also contain crosslinkable groups, so that it is possible to fix an oriented liquid-crystal polymer, for example by photocrosslinking. Crosslinked CLCPs can also be obtained by directly crosslinking low-molecular-weight precursors containing at least three functional groups or at least two polymerizable double bonds.

In a preferred embodiment, the CLCPs have very low solubility, so that their molecular weights cannot be determined by usual commercial methods (GPC or light scattering). The intrinsic viscosity of the polymers in a solution of pentafluorophenol/hexafluoroisopropanol can be used as a measure of the molecular weight. Polymers having an intrinsic viscosity of from 0.1 to 10 dl/g are suitable.

The novel polymers can be employed directly. However, it is also possible to prepare blends of the novel polymers. The blends can comprise different novel polymers, or it is possible to mix the novel polymers with cholesteric or nematic polymers.

The novel polymers can be processed further as a material. A material is a shaped structure, for example an injection molding, extruded profile or tube, tape, film or fiber.

The novel polymers are particularly suitable as base materials for the production of effect coatings of all types, for example powder effect coatings, and for the production of, in particular, effect pigments in the flake form, which are distinguished by a color effect which is dependent on the colored comonomer and the viewing angle and by an increased hiding power.

If novel polymers are not obtained from the synthesis in the form of a finely divided powder, they are converted into a finely divided powder after the synthesis for use as effect pigments or for coatings. If the synthesis is carried out as a melt condensation, a possible first comminution step after the synthesis is strand or tape extrusion. The resultant strands or tapes can be converted into chips or granules in a known manner using chippers or granulators. However, the polymers can also be isolated by other methods and subsequently subjected to coarse comminution by cutting and sawing processes. Further comminution can be carried out using grinding equipment of all types and designs. The requisite final fineness can be achieved in a single process step or in a plurality of individual steps in identical or different types of mill. If the grinding process that has been carried out does not achieve the desired minimum fineness and particle size distribution directly, it is appropriate to subject the ground material to screening or classification processes during the grinding process or after the grinding process in order to guarantee the desired minimum fineness and to obtain the desired optimum particle size fraction. Examples of grinding units are vibratory mills, vibrating disk mills, disk mills, planetary mills, centrifugal mills, end-runner mills, ball mills, cross-beta mills, impact rotor mills, cutting mills, hammer mills, knife mills, rotor-stator mills, impeller breaker mills and in particular ultra centrifugal mills, universal mills, pin mills and air-jet mills. In specific cases, wet grinding in ball mills, sand mills, vibratory mills or bead mills can also be carried out.

Grinding of the novel polymers is unnecessary if they are prepared by polymerization in an emulsified or disperse phase, in which case a finely divided powder is generally obtained.

Powder effect coatings can be applied by the following preferred methods: The finely divided polymer powder is electrostatically charged in the spraying process. This is achieved in the Corona process by feeding the powder past a charged Corona, causing the powder itself to become charged. In the triboelectric or electrokinetic process, the principle of frictional electricity is used. The powder is given, in the spray unit, an electrostatic charge which is opposite to the charge of the friction partner, generally a hose or spray tube (for example made from polytetrafluoroethylene). The electrostatic charge results in a high degree of deposition of the powder on the article to be coated. After the application process onto the object, the powder coat is heated to temperatures above the softening point of the powder, at which the polymers form a homogeneous film and the helical superstructures form. The temperature at which the formation of the helical structure begins is referred to below as the chiralization temperature.

The specific optical properties of a powder effect coating are not observed until the molecules form the helical structure above the chiralization temperature of the polymer. The transition into the cholesteric phase takes place in many cases already during synthesis of the polymers. The wavelength of the selective reflection of the CLCPs employed in accordance with the invention is determined by the pitch of the helical structure. The pitch is dependent on the structure of the polymer, the melt viscosity, the presence of solvents and in particular on the helical twisting power of the chiral monomer. It is also a function of the temperature.

Correspondingly, the pitch of the helix can also be adjusted via the temperature. The pitch of the helix and thus the selective reflection can be frozen permanently by rapid cooling of the coated substrates. In the case of slow cooling, changes in color must be expected. In general, colored substrates are also obtained by this method. However, it is difficult to predetermine the final color. If the cooled substrate is reheated, the helix pitch obtained can be the same or different, as, consequently, can the wavelength of the selective reflection. This process allows the color of the coated substrate to be varied and corrected in a simple manner. For practical use, it is important that the melting point and the chiralization temperature of the polymer are above the service temperature of the coated substrate.

The formation of the helical structure may be promoted by the temperature, the action of shear forces and by substrates with polymeric coatings, for example polyvinyl alcohol, cellulose derivatives and polyimides. The alignment process of the polymer molecules can also be positively affected by electric and magnetic fields, depending on the structure of the polymers.

A further, preferred way of coating objects with pulverulent substances is flame spraying. In this process, the powder is fluidized with a carrier gas (for example in a fluidized bed) and fed to the central nozzle of a flame spray gun. At the same time, a fuel gas/oxygen mixture is generated in the flame spray gun and is burnt in a multiplicity of small flames arranged in annular form around the center. This results in melting of the pulverulent particles, which are subsequently deposited on the object to be coated as droplets which coalesce to form a film during the spraying process. This process offers the particular advantage that the melting operation is integrated into the spraying process, so that application of the coating to the article and film formation can take place in a single step.

A further preferred embodiment for powder coating is fluidized-bed sintering. To this end, a fluidized bed is generated in a suitable container with the aid of a carrier gas and the novel polymer powder. The object to be coated is heated to the temperature necessary for the coating in a separate heat chamber and, after reaching this temperature, is immersed into the fluidized bed for a certain time. Pulverulent particles adhere to the object surface, melt, coalesce to form a film and form the helical structure. In some cases, it is advantageous to subject the coated object to a further heat treatment in order to improve film formation and alignment of the polymer molecules. In other cases, the object can be left to cool in air or quenched with water. This process also offers the particular advantage that the melting operation is integrated into the coating process, so that the application of the coating to the article, alignment of the polymer molecules and film formation can take place in a single step.

In all the powder coating processes described and in particular in the fluidized-bed sintering and flame spraying processes, the particle shape and thus the flowability of the powder and the particle size distribution of the powder are of major importance. Preference is given to particles which come as close as possible to the spherical shape and have a narrow particle size distribution. Spherical particles are obtained in a simple manner in processes in which the polymerization is carried out in an emulsified or disperse phase. The grinding processes give relatively narrow or broad particle size distributions depending on the type of mill employed. In some cases, it is advantageous to follow the grinding by a screening or classification process in order to achieve the narrowest possible particle size distribution. In other cases, it is advantageous first to prepare a very finely divided powder, which can then be agglomerated in a targeted manner to give the desired particle size.

The desired particle fineness is crucial for the thickness of the powder effect coating film, the type of object to be coated and the application method used. If thin paint films are desired on the object to be coated, a mean particle size of the powder of from 1 to 100 $\mu$m, preferably from 15 to 80 $\mu$m, should be the aim. If thick films on the object are desired, as are normally applied in fluidized-bed sintering and flame spraying, a mean particle size of from 80 to 300 $\mu$m, preferably from 100 to 250 $\mu$m, is advantageous. In fluidized-bed sintering and flame spraying, the observance of the particle size limits is particularly important. Excessively small particles are overheated by the high flame temperatures and carbonize or are blown away by the gas stream. By contrast, excessively large particles are not melted completely and cannot align optimally during subsequent film formation. However, it may in exceptional cases also be advantageous to use a particle size distribution outside this range.

Powder effect coatings can be applied to a wide variety of substrates. These can be, for example, articles made from natural and synthetic materials, for example wood, plastic, metal or glass. If the effect coating is applied without an undercoat, application in a film thickness which covers the substrate is recommended. It is of course also possible to apply more than one film or to produce semitransparent coatings. Particular preference is given to the coating of the body or body parts of motor vehicles.

In preferred cases, the powder effect coating is applied to metal or plastic substrates. These are usually precoated, i.e. plastic substrates can be provided with a plastic primer, and metallic substrates generally have an electrophoretically applied primer and, if desired, one or more further coats, for example a filler coat.

Particular preference is given to dark substrates. In this connection, the term dark substrate is taken to mean not only a substrate which is provided with a dark paint film on its surface, but also a substrate which is dark-colored per se, for example a plastic substrate or a metal substrate coated with a dark oxide coating. Examples of dark coatings are primers, plastic primers, filler and stone-chip protection coatings and single-shade base coats and top coats, in each case applied electrophoretically or by spray or powder coating. Examples of dark substrates are dark red, dark blue, dark green, dark brown, dark gray and in particular black. Powder coatings can also be applied to pale substrates or in hiding layers. However, the color impression, which is dependent on the viewing angle, is only perceived to a lesser extent.

Powder effect coatings can be covered with a clear coat by conventional methods. Suitable clear coats are in principle all known clear coats or coating compositions pigmented in a transparent manner. Both solvent-containing single-component or two-component paints and preferably water-thinnable clear coats and in particular powder coatings can be employed here. In some cases, it may be expedient to select a somewhat greater thickness of the clear coat or to apply 2 clear coats of identical or different liquid coating materials or powder coatings. As is known, the clear coat contains further auxiliaries which improve the surface properties of the coated objects. Examples which may be mentioned are UV stabilizers and light stabilizers which protect the underlying layers against degradation reactions.

Another way of converting the cholestric liquid-crystalline polymers into effect coatings is solvent coating. In this case, the polymer is dissolved in a solvent and a film is applied to the substrate to be coated from solution. This can be carried out, for example, by spraying, knife coating, pouring, immersion or by means of a brush. After evaporation of the solvent, the polymer forms a bright effect coating.

Another way of converting the cholesteric liquid-crystalline polymers into effect coatings is melt coating. In this case, the polymer is applied to the substrate from the melt or melted on the substrate and processed to give a thin film. The polymer can be applied, for example, using a heatable knife coater. However, simpler means, for example a trowel, can also be used.

The novel coatings are distinguished by simple application methods and by interesting color effects which are dependent on the viewing angle and cannot be achieved by absorption pigments alone and/or CLCP effect coatings.

In the examples below, parts are by weight.

EXAMPLE 1

9406 parts of 2-hydroxy-6-naphthoic acid, 13812 parts of 4-hydroxy-benzoic acid, 2658 parts of terephthalic acid, 2923 parts of 1,4:3,6-dianhydro-D-sorbitol (isosorbide), 1371 parts of p-aminobenzoic acid and 1569 parts of perylene-3,4,9,10-tetracarboxylic 3,4,9,10-dianhydride are mixed with 21094 parts of acetic anhydride, a gentle stream of nitrogen is passed through the mixture. The mixture is heated to 140° C. over the course of 15 minutes and then kept at this temperature for 30 minutes. The temperature is then raised to 335° C. over the course of 195 minutes. Acetic acid begins to distill off from about 200° C. After a temperature of 335° C. has been reached, the mixture is stirred at this temperature for a further 30 minutes. The nitrogen flushing is then terminated, and a vacuum is applied. The mixture is stirred under vacuum (about 5 mbar) for a further 30 minutes and then aerated with nitrogen. The polymer is then cooled and isolated.

The polymer has a very bright, reddish-silver to reddish-green color which appears reddish-violet at an oblique viewing angle.

EXAMPLE 2

27277 parts of 2-hydroxy-6-naphthoic acid, 34530 parts of 4-hydroxy-benzoic acid, 4984 parts of terephthalic acid, 5846 parts of 1,4:3,6-dianhydro-D-sorbitol (isosorbide), 3486 parts of p-aminobenzoic acid and 3923 parts of perylene-3,4,9,10-tetracarboxylic 3,4,9,10-dianhydride are mixed with 52680 parts of acetic anhydride, a gentle stream of nitrogen is passed through the mixture. The mixture is heated to 140° C. over the course of 15 minutes and then kept at this temperature for 30 minutes. The temperature is then raised to 335° C. over the course of 195 minutes. Acetic acid begins to distill off from about 200° C. After a temperature of 335° C. has been reached, the mixture is stirred at this temperature for a further 30 minutes. The nitrogen flushing is then terminated, and a vacuum is applied. The mixture is stirred under vacuum (about 5 mbar) for a further 30 minutes and then aerated with nitrogen. The polymer is then cooled and isolated.

The polymer has a very bright, golden red color which appears reddish-green at an oblique viewing angle.

EXAMPLE 3

3762 parts of 2-hydroxy-6-naphthoic acid, 6287 parts of 4-hydroxy-benzoic acid, 1661 parts of terephthalic acid, 1315 parts of 1,4:3,6-dianhydro-D-sorbitol (isosorbide) and 572 parts of N,N'-bis(3-aminophenyl)-3,4,9,10-perylenetetracarboxylic acid diimide are mixed with 10460 parts of acetic anhydride, a gentle stream of nitrogen is passed through the mixture. The mixture is heated to 140° C. over the course of 15 minutes and then kept at this temperature for 30 minutes. The temperature is then raised to 335° C. over the course of 195 minutes. Acetic acid begins to distill off from about 200° C. After a temperature of 335° C. has been reached, the mixture is stirred at this temperature for a further 30 minutes. The nitrogen flushing is then terminated, and a vacuum is applied. The mixture is stirred under vacuum (about 5 mbar) for a further 30 minutes and then aerated with nitrogen. The polymer is then cooled and isolated.

The polymer has a bright, reddish-turquoise color which appears reddish-violet at an oblique viewing angle.

EXAMPLE 4

Synthesis of a CLCP 3386 parts of 2-hydroxy-6-naphthoic acid, 6630 parts of 4-hydroxybenzoic acid, 3404 parts of (1R,3S)-(+)-camphoric acid and 3165 parts of 4,4'-dihydroxybiphenyl are mixed in a reactor with 10460 parts of acetic anhydride, and a gentle stream of nitrogen is passed through the mixture. The mixture is heated to 140° C. over the course of 15 minutes with stirring and kept at this temperature for 30 minutes. The temperature is subsequently raised to 335° C. over the course of 165 minutes, and the melt is stirred at this temperature for a further 30 minutes. Acetic acid begins to distill off from about 220° C. The nitrogen flushing is then terminated, and a vacuum is applied. The melt is stirred under a vacuum (about 5 mbar) for a further 30 minutes, then cooled to 270° C. and aerated with nitrogen. 150 parts of 5-chloro-2-(2-hydroxy-1-naphthylazo)-4-methyl-benzenesulfonic acid are introduced into the polymer melt, and the mixture is condensed at this temperature for a further hour under vacuum. The mixture is then aerated with nitrogen and cooled, and the polymer is isolated.

The polymer has a red to copper color at a perpendicular viewing angle. It changes to gold at an oblique viewing angle.

EXAMPLE 5

Synthesis of a CLCP 5640 parts of 2-hydroxy-6-naphthoic acid, 6906 parts of 4-hydroxybenzoic acid, 1661 parts of terephthalic acid, 186 parts of 4,4'-dihydroxybiphenyl, 1023 parts of 1,4:3,6-dianhydro-D-sorbitol (isosorbide) and 1303 parts of C.I. Pigment Orange 34 (C.I. No. 21115) are mixed in a reactor with 10460 parts of acetic anhydride, and a gentle stream of nitrogen is passed through the mixture. The mixture is heated to 140° C. over the course of 15 minutes with stirring and kept at this temperature for 30 minutes. The temperature is subsequently raised to 335° C. over the course of 165 minutes, and the melt is stirred at this temperature for a further 30 minutes. Acetic acid begins to distill off from about 220° C. The nitrogen flushing is then terminated, and a vacuum is applied. The melt is stirred under a vacuum (about 5 mbar) for a further 30 minutes, aerated with nitrogen and cooled, and the polymer is isolated.

The polymer has a brownish color at a perpendicular viewing angle. It changes to red-gold at an oblique viewing angle.

EXAMPLE 6

Synthesis of a CLCP 5640 parts of 2-hydroxy-6-naphthoic acid, 6906 parts of 4-hydroxybenzoic acid, 1661 parts of terephthalic acid, 745 parts of 4,4'-dihydroxybiphenyl, 877 parts of 1,4:3,6-dianhydro-D-sorbitol (isosorbide) and 130 parts of C.I. Pigment Orange 34 (C.I. No. 21115) are mixed in a reactor with 10460 parts of acetic anhydride, and a gentle stream of nitrogen is passed through the mixture. The mixture is heated to 140° C. over the course of 15 minutes with stirring and kept at this temperature for 30 minutes. The temperature is subsequently raised to 310° C. over the course of 165 minutes, and the melt is stirred at this temperature for a further 30 minutes. Acetic acid begins to distill off from about 220° C. The nitrogen flushing is then terminated, and a vacuum is applied. The melt is stirred under a vacuum (about 5 mbar) for a further 30 minutes, aerated with nitrogen and cooled, and the polymer is isolated.

The polymer has a brownish color at a perpendicular viewing angle. It changes to red-gold at an oblique viewing angle.

EXAMPLE B1

Preparation of a CLCP Powder

The polymer prepared in Example 1 is precomminuted in a cutting mill and ground to a particle size of <1 mm using a universal mill with knife insert. The final grinding is carried out at moderate throughput in a high-performance ultracentrifugal mill with a 0.2 mm screen, giving a powder having a particle size of <200 μm.

EXAMPLE B2

Preparation of a Powder Coating using a Triboelectric Spray Gun

The powder prepared in Example B1 is introduced into the powder container of a ®Tribostar spray unit from Intec, Dortmund. The spray unit is equipped with a standard spray tube and a star-shaped insert. This spray unit is used to coat an aluminum sheet primed with a black powder coating by crosswise application in a spray booth at high powder throughput and a spray pressure of 3 bar. For film formation, the coated sheet is heated to 275° C. for 5 minutes and subsequently immersed into water. This gives a homogeneous film having a thickness of about 20 μm which exhibits a reddish-blue color at a perpendicular viewing angle and a bright, red-violet color at an oblique viewing angle.

EXAMPLE B3

Preparation of a CLCP Powder

The polymer prepared in Example 2 is precomminuted in a cutting mill and ground to a particle size of <1 mm using a universal mill with knife insert. The final grinding is carried out at moderate throughput in a high-performance ultracentrifugal mill with a 0.2 mm screen, giving a powder having a particle size of <200 μm.

Example B4

Preparation of a Powder Coating Using a Triboelectric Spray Gun

The powder prepared in Example B3 is introduced into the powder container of a ®Tribostar spray unit from Intec, Dortmund. The spray unit is equipped with a standard spray tube and a star-shaped insert. This spray unit is used to coat an aluminum sheet primed with a black powder coating by crosswise application in a spray booth at high powder throughput and a spray pressure of 3 bar. For film formation, the coated sheet is heated to 275° C. for 5 minutes and subsequently immersed into water. This gives a homogeneous film having a thickness of about 25 μm which exhibits a reddish to greenish color at a perpendicular viewing angle and a bright, blue-green color at an oblique viewing angle.

EXAMPLE B5 (Grinding)

The polymer prepared in Example 4 is precomminuted in a cutting mill and ground to a particle size of <1 mm using a universal mill with knife insert.

EXAMPLE B6: (Film)

If the polymer powder from Example B5 is scattered onto a black-primed sheet preheated to 200° C., melted and spread out using a knife coater to give a film, a film is obtained which has a bright turquoise color at a perpendicular viewing angle and a bright reddish-blue color at an oblique viewing angle.

EXAMPLE B7 (Grinding)

The polymer prepared in Example 5 is precomminuted in a cutting mill and ground to a particle size of <1 mm using a universal mill with knife insert.

Example B8: (Film)

If the polymer powder from Example B7 is scattered onto a black-primed sheet preheated to 250° C., melted and spread out using a knife coater to give a film, a film is obtained which has a bright golden red color at a perpendicular viewing angle and a bright golden green color at an oblique viewing angle.

EXAMPLE B9 (Grinding)

The polymer prepared in Example 6 is precomminuted in a cutting mill and ground to a particle size of <1 mm using a universal mill with knife insert.

EXAMPLE B10: (Film)

If the polymer powder from Example B9 is scattered onto a black-primed sheet preheated to 250° C., melted and spread out using a knife coater to give a film, a film is obtained which has a bright copper color at a perpendicular viewing angle and a bright golden orange color at an oblique viewing angle.

EXAMPLE B11: (Film)

If a warm 5% strength solution of the polymer from Example B3 is poured onto a preheated Ceran plate and brushed out thereon to give a thin film, and the solvent is completely evaporated, a bright golden-red film is obtained which has a bright greenish color at a perpendicular viewing angle.

We claim:

1. A cholesteric liquid-crystalline polymer which contains:
    at least one colored comonomer which absorbs light in the visible wavelength region, and
    at least one cholesteric liquid-crystalline polymer wherein said cholesteric liquid-crystalline polymer is a main-chain polymer, a side-group polymer, or a combination thereof, wherein:
        said cholesteric liquid-crystalline side-group polymer is a polysiloxane, a cyclic siloxane, a polyacrylate, a polymethacrylate or a combination thereof, containing mesogens in the side-group or groups;
        said cholesteric liquid-crystalline main-chain polymer is a polyester, a polyamide or a polyesteramide, containing an aromatic hydroxycarboxylic acid, a cycloaliphatic hydroxycarboxylic acid, an aromatic aminocarboxylic acid, an aromatic dicarboxylic acid, a cycloaliphatic dicarboxylic acid, an aromatic diol, a cycloaliphatic diol, an aromatic diamine, a cycloaliphatic diamine or a combination thereof, and containing a chiral, bifunctional comonomer;
        said colored comonomer is a bifunctional hydroxyl derivative, a bifunctional amino derivative, or a bifunctional carboxyl derivative, of an anthanthrone pigment, an anthraquinone pigment, a dioxazine pigment, a phthalocyanine pigment, a quinacridone pigment, a diketopyrrolopyrrol pigment, a perylene pigment, a perinone pigment, an azomethine pigment, an azo pigment, an aminostilbenecarboxylic acid or a combination thereof.

2. A cholesteric liquid-crystalline polymer as claimed in claim 1, wherein the main-chain polymer comprises from 0 to 99.8 mol % of at least one compound from the group consisting of aromatic hydroxycarboxylic acids, cycloaliphatic hydroxycarboxylic acids and aromatic aminocarboxylic acids;
    from 0 to 50 mol % of at least one compound from the group consisting of aromatic dicarboxylic acids and cycloaliphatic dicarboxylic acids;
    from 0 to 50 mol % of at least one compound from the group consisting of aromatic and cycloaliphatic diols and diamines;
    from 0.1 to 40 mol % of chiral, bifunctional comonomers; and
    from 0.1 to 50 mol % of bifunctional, colored components which have at least one absorption in the wavelength region of visible light, where the sum is 100 mol %.

3. A cholesteric liquid-crystalline polymer as claimed in claim 2, comprising from 1 to 25 mol % of chiral, bifunctional comonomers.

4. A cholesteric liquid-crystalline polymer as claimed in claim 2, comprising from 1 to 25 mol % of bifunctional, colored components which have at least one absorption in the wavelength region of visible light.

5. A cholesteric liquid-crystalline polymer as claimed in claim 1, wherein the main-chain polymer contains at least one compound from the group consisting of p-hydroxybenzoic acid, 2-hydroxy-6-naphthoic acid, terephthalic acid, isophthalic acid, 2,6-naphthalenedicarboxylic acid, hydroquinone, resorcinol and 4,4'-dihydroxybiphenyl.

6. A cholesteric liquid-crystalline polymer as claimed in claim 1, wherein the chiral, bifunctional comonomer is at least one compound from the group consisting of isosorbide, isomannide, camphoric acid, methylpiperazine, 3-methyladipic acid, butane-2,3-diole,

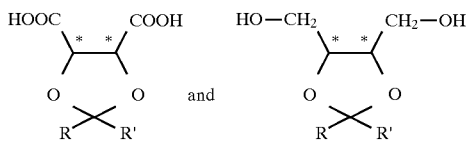

where R and R' are each, independently of one another, H, $C_1$–$C_6$-alkyl or phenyl.

7. A cholesteric liquid-crystalline polymer as claimed in claim 6, wherein R and R' are H or $CH_3$.

8. A cholesteric liquid-crystalline polymer as claimed in claim 1, wherein the polymer contains at least one monomer from the group consisting of p-hydroxybenzoic acid, 2-hydroxy-6-naphthoic acid, terephthalic acid, isophthalic acid, 2,6-naphthalenedicarboxylic acid, hydroquinone, resorcinol and 4,4'-dihydroxybiphenyl; camphoric acid, isosorbide, isomannide as the chiral component; and, as colored component at least one of the compounds N,N'-bis-(3-aminophenyl)-3,4,9,10-perylenetetracarboxylic acid diimide, N,N'-bis-(4-hydroxyphenyl)-3,4,9,10-perylenetetracarboxylic acid diimide, N,N'-bis-(4-carboxyphenyl)-3,4,9,10-perylenetetracarboxylic acid diimide and perylene-3,4,9,10-tetracarboxylic 3,4,9,10-dianhydride.

9. A process for the preparation of a cholesteric liquid-crystalline polymer as claimed in claim 1, which comprises condensing the monomers or reactive derivatives thereof, on which the polymer is based.

10. A method for the preparation of an effect pigment comprising the step of providing said cholesteric liquid-crystalline polymer according to claim 1 in the form selected from the group consisting of a finely divided powder, a solution and a melt.

11. A method for the preparation of an effect coating comprising the steps of:

providing said cholesteric liquid-crystalline polymer according to claim 1 in the form selected from the group consisting of a finely divided powder, a solution, and a melt; and applying said cholesteric liquid-crystalline polymer onto a substrate.

* * * * *